United States Patent [19]

Greene, Jr.

[11] 4,235,401
[45] Nov. 25, 1980

[54] AUTOMATIC TRAIN STOPPING

[75] Inventor: John Greene, Jr., Leeds, Ala.

[73] Assignee: Gregory S. Prince, Chevy Chase, Md. ; a part interest

[21] Appl. No.: 20,500

[22] Filed: Mar. 14, 1979

[51] Int. Cl.³ .............................................. B60T 7/12
[52] U.S. Cl. ...................................... 246/172; 303/1
[58] Field of Search ...................... 246/171, 172, 199; 303/1

[56] References Cited

U.S. PATENT DOCUMENTS

| 788,744 | 5/1905 | Wright | 246/172 |
|---|---|---|---|
| 1,078,031 | 11/1913 | Bodie | 246/172 |
| 1,227,913 | 5/1917 | Jesson | 246/172 |
| 1,240,127 | 9/1917 | Ewing | 246/172 |

Primary Examiner—Duane A. Reger
Attorney, Agent, or Firm—Cushman, Darby & Cushman

[57] ABSTRACT

A method and structure for automatically stopping a train riding on a railroad track should at least one wheel of the train go off of the track. The train has a conventional pneumatic brake line, with which a cutting arrangement is operatively associated for actuation should one wheel of the train go off the track, the severing of the pneumatic brake line allowing release of air so as to gradually apply the brakes and ultimately stop the train.

6 Claims, 6 Drawing Figures

AUTOMATIC TRAIN STOPPING

BACKGROUND AND SUMMARY OF THE INVENTION

On conventional railroad trains, should a set of wheels come off the track and drop onto the ground, there is no way for the engineer to know that that event has occurred. The locomotive may drag the car whose wheels have come off the track several miles before the derailed wheels hit an obstruction, which ultimately causes a train wreck. Conventional trains have a pneumatic brake line mounted on the frame of each car, and air compressors in the locomotive pressurizing the air in the brake lines and carrying it to the brakes associated with each train car. The braking system is conventionally constructed so that should the pressure in the brake line be lost, the brakes will be automatically applied. In situations where there is a catastrophic release of air from the brake lines (as by the iron brake pipes rupturing or by the rubber connecting hoses coming loose), the brakes will go into emergency application.

According to the present invention, a method and apparatus are provided for facilitating the stopping of a train having a conventional pneumatic brake line should at least one wheel of the train go off the track. Utilizing the automatic stopping according to the present invention, it is possible to gradually bring the train to a halt before the train wrecks, or if the train ultimately does wreck, due to the reduced velocity caused by the stopping action according to the present invention, such a wreck should be much less severe.

According to a preferred method of the present invention, the stopping of a train when a wheel of one of its cars has left the track is accomplished by a method comprising the step of piercing a pneumatic brake line sufficiently to allow release of air from the brake line in response to the force created by a wheel of the train dropping down from the track on which it is riding. The piercing preferably takes place only in response to excessive vertical movement of the wheel, and effects sufficient leakage of air from the brake line to ultimately stop the train, but insufficient to cause catastrophic leakage of air from the brake line which would cause emergency stopping. The piercing is preferably accomplished by a cutting tool operatively connected to each wheel set of the train.

According to a preferred apparatus of the present invention, in combination with a railroad car having wheels and a pneumatic brake line, there is provided: means for facilitating stopping the train in response to at least one of the wheels going off the track, such means comprising means for piercing a pneumatic brake line to allow release of air from the brake line in response to at least one of the wheels going off the track. The piercing means preferably comprises a piercing mechanism mounted adjacent the brake line, and means interconnecting the piercing mechanism to at least one of the wheel sets of the railroad car, so that upon vertical movement of a wheel of the set a vertical distance corresponding to approximately half the height of the rail the piercing mechanism is activated, the activating force comprising the weight of the railroad car. The interconnecting means preferably comprises a cable or rod, having a loop formed at one end thereof, the loop loosely fitting around at least one axle of the wheel set. The piercing mechanism preferably comprises an arcuate cutting blade mounted for pivotal movement with respect to the brake line from a position wherein it does not pierce the brake line to a position wherein under the force of the railroad car weight the brake line is pierced, the interconnecting means comprising a lever operatively attached to the arcuate cutting blade for effecting pivotal movement thereof.

The apparatus according to the present invention is simple, easy to manufacture and install (it can be readily retrofitted on conventional trains without sending the cars to railroad shops), and should last the life of the railroad cars with which it is utilized. Additionally, it is not susceptible to false triggering since it responds only to vertical movement of the wheels off the tracks, not the horizontal movement normally encountered when the train rounds curves, etc.

It is the primary object of the present invention to provide a simple and inexpensive method and apparatus for automatically stopping a railroad train should at least one wheel of the train go off the track. This and other objectives of the invention will become clear from an inspection of the detailed description of the invention, and from the appended claims.

DETAILED DESCRIPTION OF THE DRAWINGS

Figure 1:
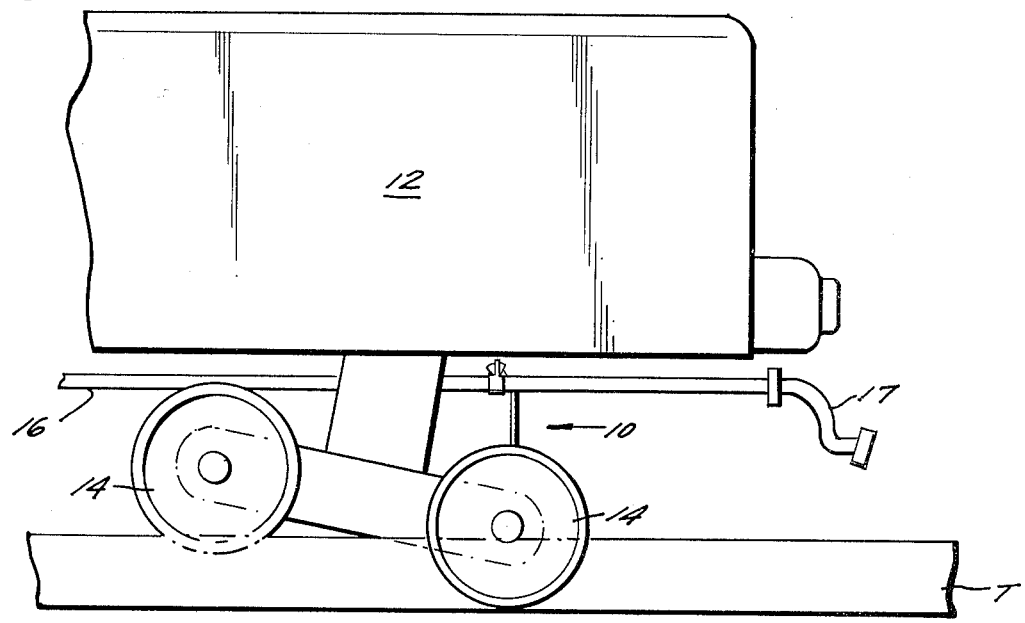
FIG. 1 is a detailed side view of an exemplary mechanism according to the present invention shown in place on a railroad car.
Figure 2A:
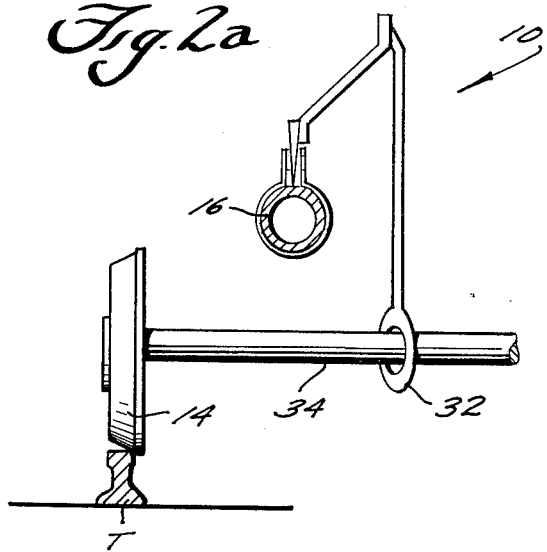
FIGS. 2a and 2b are detailed views of an exemplary mechanism according to the present invention illustrated before actuation thereof and after actuation thereof, respectively.
Figure 2B:
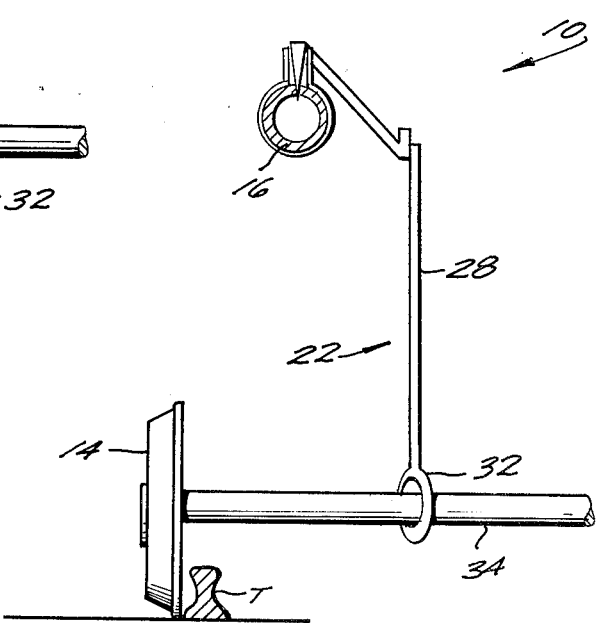

Means for facilitating stopping of a train in response to at least one wheel of the train going off the track are shown generally at 10 in the drawings, in combination with a railroad car 12 having wheels 14 provided in a plurality of sets, two wheels connected by an axle 34 being provided in each set, and two sets being ganged on a carriage. The car also has a pneumatic brake line 16 extending the length of the car, the brake line 16 conventionally comprising a cast iron pipe, having a rubber connection 17 at the end thereof for connection to the brake line of another car of the train. The stopping facilitating means 10 includes means for releasing air from line 16 to allow release of air from the brake line in response to at least one of the wheels 14 going off the track T on which it is adapted to ride, as indicated in FIGS. 1 and 2b.

The means 10 includes a piercing mechanism, such as an arcuate cutting blade 20, and means 22 interconnecting the arcuate cutting blade 20 and at least one of the railroad car wheel sets so that upon vertical movement of a wheel 14 of the wheel set a vertical distance corresponding to approximately the height of the rail T, the arcuate cutting blade 20 is moved into piercing relationship with the brake line 16. The conventional brake line 16 is a cast iron pipe; therefore, the blade 20 must have sufficient properties to penetrate the pipe 16 to effect release of air therefrom. Since the actuating force is provided by the weight of the railroad car 12, the cutting force applied by the blade normally would be large.

The blade 20 preferably is pivoted about the axis through pivot pin 24 mounted by bracket arms 25 of the bracket 26 which surrounds the pipe 16.

The interconnecting means 22 preferably comprises a cable or rod 28 which is operatively attached to a lever 30, which in turn is connected to the arcuate cutting blade 20. At the opposite end of the cable or rod 28 from lever 30 a loop or ring 32 is provided, the loop 32 fitting loosely around the axle 34 interconnecting a pair of wheels 14 of a wheel set associated with the railroad car 12. In the preferred embodiment each axle is equipped with the means 10 including the cutting blade 20 and the interconnecting means 22. The loose fitting of the loop 32 about the axle 34 ensures that the means 10 will not be actuated in response to horizontal movement of the wheels, as when the train is going around a curve in the tracks, but rather will be actuated only upon excessive vertical movement of the wheels 14, as by dropping off of the track T (compare FIGS. 2a and 2b).

The brake line 16 is of the conventional type which is continuously supplied with air from compressors mounted on the locomotive of the train. Should the pressure in line 16 be reduced, the brakes associated with the wheels 14 of the entire train will be actuated, ultimately causing the train to come to a stop. The cutting blade 20 is designed, however, so that when it pierces the brake line 16 it does so sufficiently to ultimately stop the train, but insufficiently to cause catastrophic stopping thereof, as is normally provided in an emergency application when a rubber hose connection 17 bursts, a pipe 16 is ripped off, or the like. The cutting blade 20 can be installed anywhere along the train brake pipe with the appropriate linkage means 22.

According to the method of the present invention, a method of facilitating stopping of a train riding on a railroad track T is provided, comprising the step of piercing the pneumatic brake line 16 of the train sufficiently to allow release of air from the brake line 16, in response to at least one wheel 14 of the train going off the railroad tract T on which it is riding.

Figure 3A:
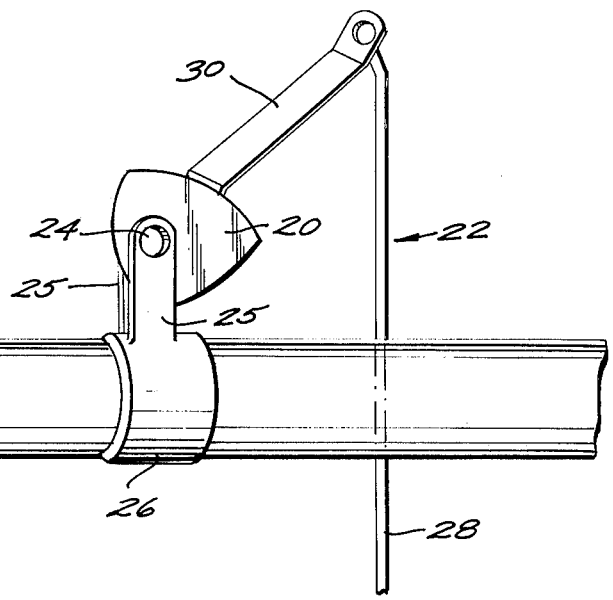
FIGS. 3a through 3c are sequential detailed views of the cutting mechanism of an exemplary assembly according to the present invention illustrating the operation thereof.

An exemplary operation according to the present invention will now be described. In the normal position of the train, indicated in FIGS. 2a and 3a, the loop 32 will be loosely disposed around the axle 34, and the lever 30 will be in upright position.

Figure 3B:
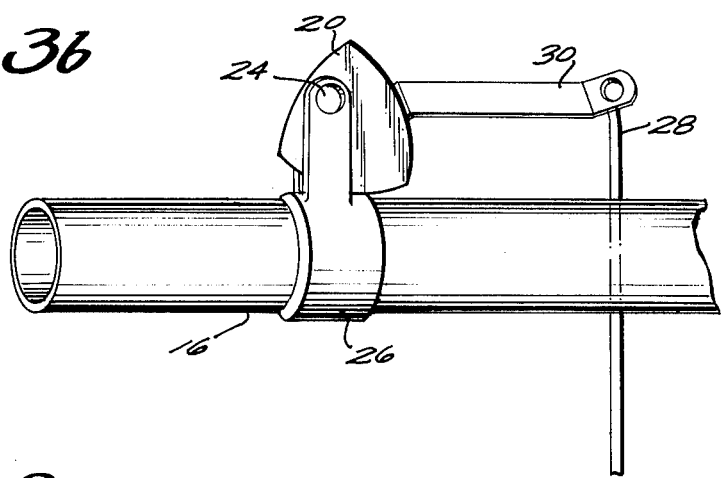
Figure 3C:
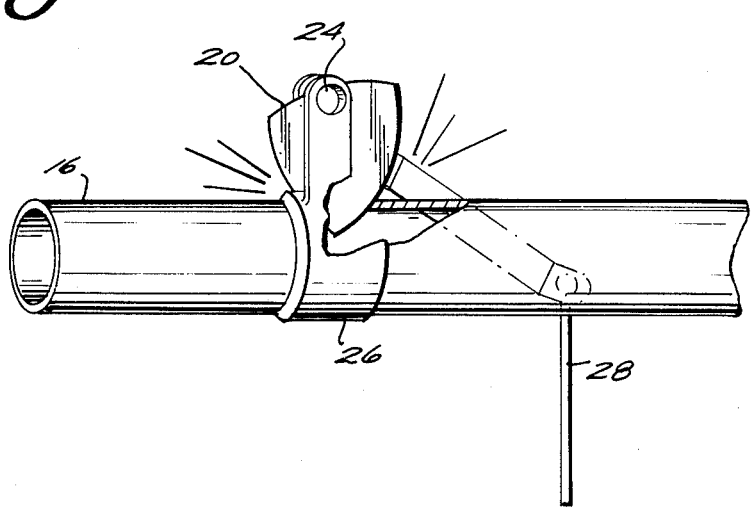

Upon a wheel 14 of the train going off the tract T, as illustrated in FIGS. 1a and 2b, the axle 34 will engage the loop 32 and the weight of the railroad car 12 will provide a downward pulling force on the cable 28. This force will in turn be transferred to the lever 30, which will initiate pivoting of the cutting blade 20 about the pivot pin 24, as illustrated in FIG. 3b, until ultimately the wheel 14 moves an excessive vertical distance, such as approximately half the height of the rail, at which point the cable 28 has moved the lever 30 downwardly a sufficient distance to cause the blade 20 to penetrate the brake line 16, as illustrated in FIGS. 2b and 3c, thereby causing leakage of air from the brake line 16 sufficient to cause the brakes of the train to be applied, but insufficient to cause catastrophic stoppage of the train.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent combinations and methods.

What is claimed is:

1. In combination with a railroad car having a plurality of wheel sets and brakes, the wheels adapted to ride on a railroad track, and a pneumatic brake line;
    mean for facilitating stopping of the railroad car in response to at least one of said wheels going off the track by automatically piercing said pneumatic brake line to release air therefrom, said means comprising
    a piercing mechanism mounted adjacent said brake line and comprising an arcuate cutting blade mounted for pivotal movement with respect to said brake line from a position wherein it does not pierce said brake line to a position wherein, under the force of the railroad car weight, said brake line is pierced; and means interconnecting said piercing mechanism to at least one of said railroad car wheel sets so that upon vertical movement of a said wheel of said wheel set a vertical distance corresponding to approximately half the height of the rail said piercing mechanism is activated, said interconnecting means including a lever operatively attached to said arcuate cutting blade for effecting pivotal movement thereof.

2. A combination as recited in claim 1 wherein said wheels have axles, and wherein said interconnecting means comprises a cable having a loop formed at one end thereof and fitting loosely around at least one axle of at least one wheel set, said cable connected at the other end thereof to said lever operatively attached to said arcuate cutting blade.

3. A combination as recited in claim 1 or 2 wherein said piercing mechanism further comprises a bracket mounted on said pneumatic brake line and having a pair of bracket arms extending from a portion thereof, said bracket arms receiving said arcuate cutting blade therebetween, and a pivot pin mounting said arcuate cutting blade to said bracket arms for pivotal movement with respect to said bracket arms.

4. A combination as recited in claim 3 wherein said pneumatic brake line is cast iron or the like, said cutting blade being effective for piercing said cast iron pneumatic line.

5. A combination as recited in claim 1 wherein said pneumatic brake line is cast iron or the like, said cutting blade being effective for piercing said cast iron pneumatic line.

6. In combination with a railroad car having wheels and brakes, the wheels being provided in a plurality of wheel sets and the wheels having axles and being adapted to ride on a railroad track, and a pneumatic brake line;
    means for automatically facilitating stopping of the railroad car in response to at least one of said wheels going off the track, said means comprising;
    means for piercing said brake line to effect release of air therefrom, and including a piercing mechanism mounted adjacent said brake line, and means interconnecting said piercing mechanism to at least one of said railroad car wheel sets so that upon vertical movement of a said wheel of said wheel set a vertical distance corresponding to approximately half the height of the rail said piercing mechanism is activated, the activating force comprising the weight of said railroad car; and
    said interconnecting means comprising a cable having a loop formed at one end thereof which loosely fits around at least one axle of at least one wheel set.

* * * * *